J. SHANNON.
TRANSMISSION CONTROL DEVICE FOR MOTOR VEHICLES.
APPLICATION FILED SEPT. 30, 1916.

1,215,206.  Patented Feb. 6, 1917.

Inventor
J. Shannon,

Witnesses

By Victor J. Evans
Attorney

UNITED STATES PATENT OFFICE.

JOHN SHANNON, OF STONINGTON, CONNECTICUT.

TRANSMISSION-CONTROL DEVICE FOR MOTOR-VEHICLES.

1,215,206.  Specification of Letters Patent.  Patented Feb. 6, 1917.

Application filed September 30, 1916. Serial No. 123,164.

*To all whom it may concern:*

Be it known that I, JOHN SHANNON, a citizen of the United States, residing at Stonington, in the county of New London and State of Connecticut, have invented new and useful Improvements in Transmission-Control Devices for Motor - Vehicles, of which the following is a specification.

This invention relates to transmission control device for motor vehicles, the object in view being to provide means adapted to be applied to and used in conjunction with the transmission controlling lever, whereby said lever is held at a neutral point or in other words at a point where the transmission mechanism is not in gear.

A further object of the invention is to provide means of the character above referred to which will operate automatically for the purpose set forth and which may be thrown out of operation by foot pressure for the purpose of releasing the transmission lever in order to allow the latter to be operated for its ordinary functions.

With the above and other objects in view, the invention consists in the novel construction, combination and arrangement of parts, herein described, illustrated and claimed.

In the accompanying drawing:—

Figure 1:
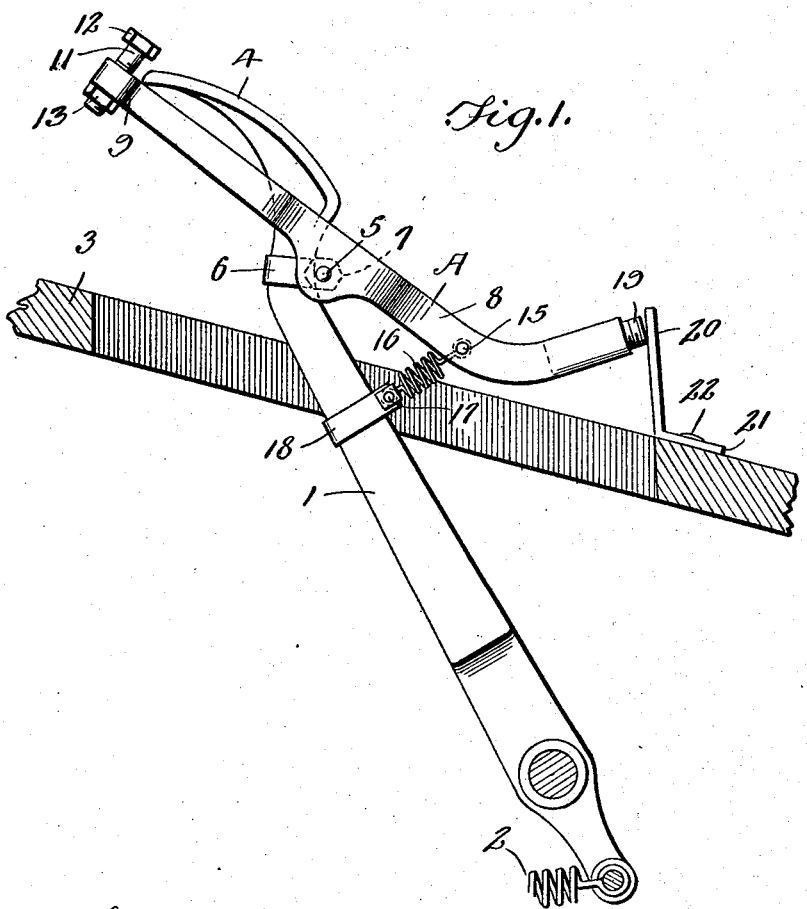
Figure 1 is a side elevation of the transmission lever of a motor vehicle, showing the automatic holding means in its applied relation thereto and also showing a portion of the floor of a vehicle in section.

Referring to the drawing, 1 designates the ordinary transmission lever such as is now commonly used in connection with the ordinary planetary transmission gearing, said lever being ordinarily pushed in a forward direction to produce first or low speed, and being released and allowed to be drawn backwardly by the action of the usual spring 2 for the purpose of obtaining high speed. 3 designates the floor of a motor vehicle through which the lever 1 operates and above which said lever is provided with a pedal 4.

Figure 2:
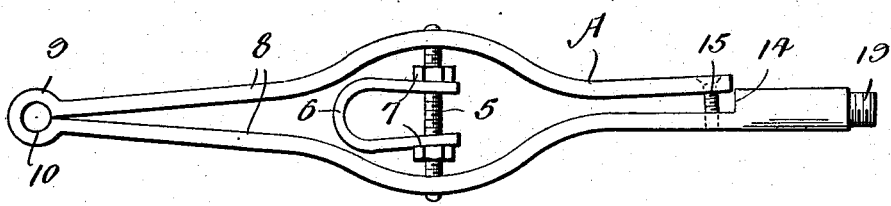
Fig. 2 is a plan view of the latch.

In carrying out the present invention, I employ a latch designated generally at A and shown in the form of a lever which is mounted between its ends on a fulcrum pin 5. The fulcrum pin 5 is carried by a U-shaped clamp 6 which is adapted to be placed around the lever 1 and clamped in place by means of nuts 7 which are threaded on the fulcrum pin 5 at opposite sides of the clamp 6 as shown in Fig. 2. The latch as a whole is formed as clearly illustrated in Fig. 2, said latch comprising the two side longitudinal members 8 which are preferably formed integrally, being connected together by a recurved portion 9 which is formed with a threaded hole 10 to receive a toe piece shown in the form of a bolt 11 adjustable therein and having its head 12 arranged to project slightly above the extremity of the pedal 4, the bolt 11 being held fixedly in place by means of a lock nut 13 which bears against the under side of the latch A. The latch is split as shown at 14 and the free end portion of the member 8 of the latch is secured to the corresponding member 8 thereof by means such as a fastening screw 15 which also serves as a fastener for one end of a coiled contractile spring 16. The other end of this spring 16 is fastened to the clamping bolt 17 of another clamp 18 which embraces the lever 1 and is applied thereto in the same manner as the clamp 6 hereinabove referred to. The rear end of the latch A is longitudinally bored and threaded to receive an adjustable cap screw 19 which strikes against a stop 20 shown in the form of an L-shaped piece of metal having an attaching portion 21 secured to the floor 3 of the machine by fastening means 22.

The toe piece 11 may be adjusted in relation to the latch 8 in order to regulate the amount of projection of said toe piece above the tread surface of the pedal 4 at the free end of the transmission lever. This enables each driver to adjust the latch to suit his individual taste.

In Fig. 1 of the drawings the lever 1 is shown in its neutral position, at which time the rear arm of the latch A is held depressed by the spring 16 and in contact with the stop 10. To throw the latch out of its holding position, the operator presses upon the head 12 thereby depressing the forward arm of the latch and correspondingly elevating the rear arm thereof until it may pass over the top of the stop 20, permitting the lever 21 to be thrown back by the spring 2 until the high speed position is obtained. The latch A will not interfere with the movement of the lever 21 to its low speed position.

By constructing the latch in the manner above described, the side arms 8 may be spread apart to allow the latch to be sprung over the lever 1 and to be removed therefrom.

I claim:—

1. The combination with the transmission lever of a motor vehicle, of a stop secured in fixed relation to the vehicle body, and a latch pivotally mounted on said lever and adapted to be shifted into position to engage said stop or into position to clear said stop, said latch embodying a threaded member having an adjustable relation thereto and adapted to abut against the stop, said threaded member providing for increasing or diminishing the distance between the latch and the transmission lever.

2. The combination with the transmission lever of a motor vehicle, of a stop secured in fixed relation to the vehicle body, a latch pivotally mounted on said lever and adapted to be shifted into position to engage said stop or into position to clear said stop, and a toe-piece having a threaded and adjustable connection with said latch at a point beyond the extremity of the transmission lever, said toe-piece being adjustable in a plane substantially at a right angle to the latch.

In testimony whereof I affix my signature.

JOHN SHANNON.

Copies of this patent may be obtained for five cents each, by addressing the "Commissioner of Patents, Washington, D. C."